(12) United States Patent
Jung et al.

(10) Patent No.: US 8,343,663 B2
(45) Date of Patent: Jan. 1, 2013

(54) METHOD OF PREPARING POSITIVE ACTIVE MATERIAL WITH LOW CARBON CONTENT FOR RECHARGEABLE LITHIUM BATTERY

(75) Inventors: Won-Il Jung, Suwon-si (KR); Jun-Won Suh, Suwon-si (KR); Yong-Chul Park, Suwon-si (KR); Geun-Bae Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 585 days.

(21) Appl. No.: 12/206,091

(22) Filed: Sep. 8, 2008

(65) Prior Publication Data

US 2009/0004097 A1    Jan. 1, 2009

Related U.S. Application Data

(62) Division of application No. 11/049,715, filed on Feb. 4, 2005.

(30) Foreign Application Priority Data

Feb. 6, 2004    (KR) .................. 10-2004-0007896

(51) Int. Cl.
  $H01M$ 4/13     (2010.01)
  $H01M$ 4/131    (2010.01)
  $H01M$ 4/1315   (2010.01)
  $H01M$ 4/139    (2010.01)
  $H01M$ 4/1391   (2010.01)
  $H01M$ 4/13915  (2010.01)

(52) U.S. Cl. ................. 429/231.1; 29/623.1; 429/223; 429/224; 429/231.3

(58) Field of Classification Search .......... 429/122–347; 29/623.1–623.5
See application file for complete search history.

(56) References Cited

U.S. PATENT DOCUMENTS

| 5,993,998 A | 11/1999 | Yasuda |
| 7,338,734 B2 | 3/2008 | Chiang et al. |
| 2002/0110736 A1 | 8/2002 | Kweon et al. |
| 2004/0180263 A1 | 9/2004 | Kase et al. |

FOREIGN PATENT DOCUMENTS

| JP | 08213015 | 8/1996 |
| JP | 11288716 | 10/1999 |
| JP | 2002158011 | 5/2002 |
| JP | 2002184402 | 6/2002 |

(Continued)

OTHER PUBLICATIONS

Machine Translation of JP 2003086182 published to Kotsuki et al. on Mar. 2003.*

(Continued)

*Primary Examiner* — Basia Ridley
*Assistant Examiner* — Jonathan G Leong
(74) *Attorney, Agent, or Firm* — H.C. Park & Associates, PLC

(57) ABSTRACT

The present invention relates to a method of preparing a positive active material for a rechargeable lithium battery. The positive active material includes a lithium/nickel-based compound wherein primary particles having an average particle diameter ranging from 1 μm to 4 μm are agglomerated to form secondary particles. The positive active material of the present invention has excellent electrochemical performance and outstanding inhibition to swelling at high temperatures.

9 Claims, 6 Drawing Sheets

FOREIGN PATENT DOCUMENTS

| | | | | |
|---|---|---|---|---|
| JP | 2002234733 | A | * | 8/2002 |
| JP | 2003086182 | A | * | 3/2003 |
| JP | 2003168428 | | | 6/2003 |
| JP | 2004087487 | | | 3/2004 |

OTHER PUBLICATIONS

Machine Translation of JP 2002-234733 originally published to Shoji et al. on Aug. 23, 2002.*

Non-Final Office Action dated Dec. 4, 2008 in U.S. Appl. No. 11/049,715.

Advisory Action issued on Oct. 14, 2010 in co-pending U.S. Appl. No. 11/049,715.

Final Office Action of U.S. Appl. No. 11/049,715 dated Mar. 16, 2012.

Advisory Action dated May 21, 2012 for U.S. Appl. No. 11/049,715.

Non-Final Office Action dated Dec. 23, 2011 for U.S. Appl. No. 11/049,715.

U.S. Non-Final Office Action dated Jul. 28, 2010 (from co-pending U.S. Appl. No. 11/049,715).

Final Office Action dated Jul. 28, 2010 in U.S. Appl. 11/049,715.

Non Final Office Action dated May 14, 2009 (from copending U.S. Appl. No. 11/049,715).

* cited by examiner

METHOD OF PREPARING POSITIVE ACTIVE MATERIAL WITH LOW CARBON CONTENT FOR RECHARGEABLE LITHIUM BATTERY

CROSS REFERENCE TO RELATED APPLICATION

This application is a divisional of prior U.S. application Ser. No. 11/049,715, filed Feb. 4, 2005, which claims priority to and the benefit of Korean Patent Application No. 10-2004-0007896, filed on Feb. 6, 2004, which are all hereby incorporated by reference for all purposes as if fully set forth herein.

FIELD OF THE INVENTION

The present invention relates to a positive active material for a rechargeable lithium battery, a method of preparing the same, and a rechargeable lithium battery comprising the same. More specifically, the invention relates to a positive active material for a rechargeable lithium battery that has excellent electrochemical performance and outstanding inhibition of swelling at high temperatures, a method of preparing the same, and a rechargeable lithium battery comprising the same.

BACKGROUND OF THE INVENTION

The use of portable electronic equipment has increased as the devices have become lighter and smaller, due to recent developments in the electronics industry. Accordingly, research on batteries as a power source for this portable electronic equipment with a higher energy density has also increased.

A rechargeable lithium battery is fabricated by filling an organic electrolytic solution or polymer electrolyte between positive and negative electrodes. The electrodes reversibly intercalate and deintercalate lithium ions, and produce electrical energy through oxidation and reduction reactions during the intercalation and deintercalation of the lithium ions.

Lithium has commonly been used as the negative active material for rechargeable lithium batteries. Carbon-based materials such as crystalline and amorphous carbon have been replacing lithium metal because lithium causes short circuits in the batteries as a result of the formation of dendrites, and can also bring about explosions.

The positive active material is known to play the most important role in safety and performance of a rechargeable lithium battery. Because of this, chalcogenide compounds or complex oxide materials such as $LiCoO_2$, $LiMn_2O_4$, $LiNiO_2$, $LiNi_{1-x}Co_xO_2$ ($0 \leq x \leq 1$), $LiMnO_2$, and so on are being studied. Cobalt-based materials, including $LiCoO_2$ are the most widely examined as a positive active material due to high energy density (theoretical capacity of 274 mAh/g with $LiCoO_2$) and excellent cycle life characteristics (capacity retention).

However, due to its structural instability, only about 50% of the theoretical capacity of $LiCoO_2$, which is approximately 140 mAh/g at a charge voltage of 4.2V, is practically obtained that is to say, the non-utilized amount of Li in $Li_xCoO_2$ is over 50% (x>0.5). In order to obtain more than 50% of the theoretical capacity of $LiCoO_2$, the charge voltage must be increased to over 4.2V. But the potentially usable x value, which represents the amount of Li in $Li_xCoO_2$, decreases to under 0.5 when the voltage is increased, and a consequential structural instability due to a phase transition from a hexagonal to a monoclinical structure also sharply decreases its capacity retention.

As a result, the search continues for a positive active material for a rechargeable lithium battery that has a high energy density at a high charge voltage of greater than 4.2V, and excellent cycle life. For example, $LiNi_xCo_{1-x}O_2$ ($0 \leq x \leq 1$), $LiNi_xMn_{1-x}O_2$ ($0 \leq x \leq 1$), $Li(Ni_xCo_{1-2x}Mn_x)O_2$ ($0 \leq x \leq 1$), $LiCoO_2$, and $LiNiO_2$ derivatives where elements such as Ni, Co, Mn, and so on are modified (Solid State Ionics, 57,311 (1992), J. Power. Sources, 43-44, 595 (1993), Japanese Laid-Open Patent Pyung 8-213015 (Sony Company (1996)), U.S. Pat. No. 5,993,998 (Japan Storage Battery) (1997)) are being examined. However, these positive active materials have a disadvantage of poor inhibition with regard to swelling at high temperatures.

SUMMARY OF THE INVENTION

An aspect of the present invention provides a positive active material for a rechargeable lithium battery that features outstanding electrochemical performance and excellent inhibition of swelling at high temperatures.

The present invention also provides a method of preparing a positive active material for a rechargeable lithium battery.

In addition, the present invention also provides a rechargeable lithium battery comprising the aforementioned positive active material.

In order to accomplish these aspects, the present invention provides a positive active material for a rechargeable lithium battery that is a lithium/nickel-based material, wherein primary particles having an average diameter of 1 μm to 4 μm are agglomerated to form secondary particles.

The present invention provides a method to prepare a positive active material for a rechargeable lithium battery comprising the secondary particles composed of the primary particles whose average particle diameter is 1 μm to 4 μm. The processes of this preparation are as follows: preparing an oxide material by heat-treating a hydroxide compound that includes nickel and cobalt, nickel, cobalt, and a metal (such as Al, Cr, Fe, Mg, Sr, V, and rare earth element), nickel, cobalt, and manganese, or nickel, cobalt, manganese, and a metal (such as Al, Cr, Fe, Mg, Sr, V, and rare earth elements); mixing the oxide material with a lithium-containing compound and performing a first heat treatment to the resulting mixture; and performing a second heat treatment to the first heat-treated mixture. The present invention provides a rechargeable lithium battery with a positive electrode that includes the positive active material, a negative electrode that includes a negative active material, and an electrolyte. The negative active material may include lithium metal, a lithium-containing alloy, a material which is capable of reversibly intercalating and deintercalating lithium ions, or a material that can form a lithium-containing compound by reversibly reacting with lithium.

BRIEF DESCRIPTION OF THE DRAWING

A more complete appreciation of the invention and its advantages will become readily apparent as the invention becomes better understood by reference to the following detailed description when considered in conjunction with the accompanying drawings.

DETAILED DESCRIPTION OF THE INVENTION

Figure 1:
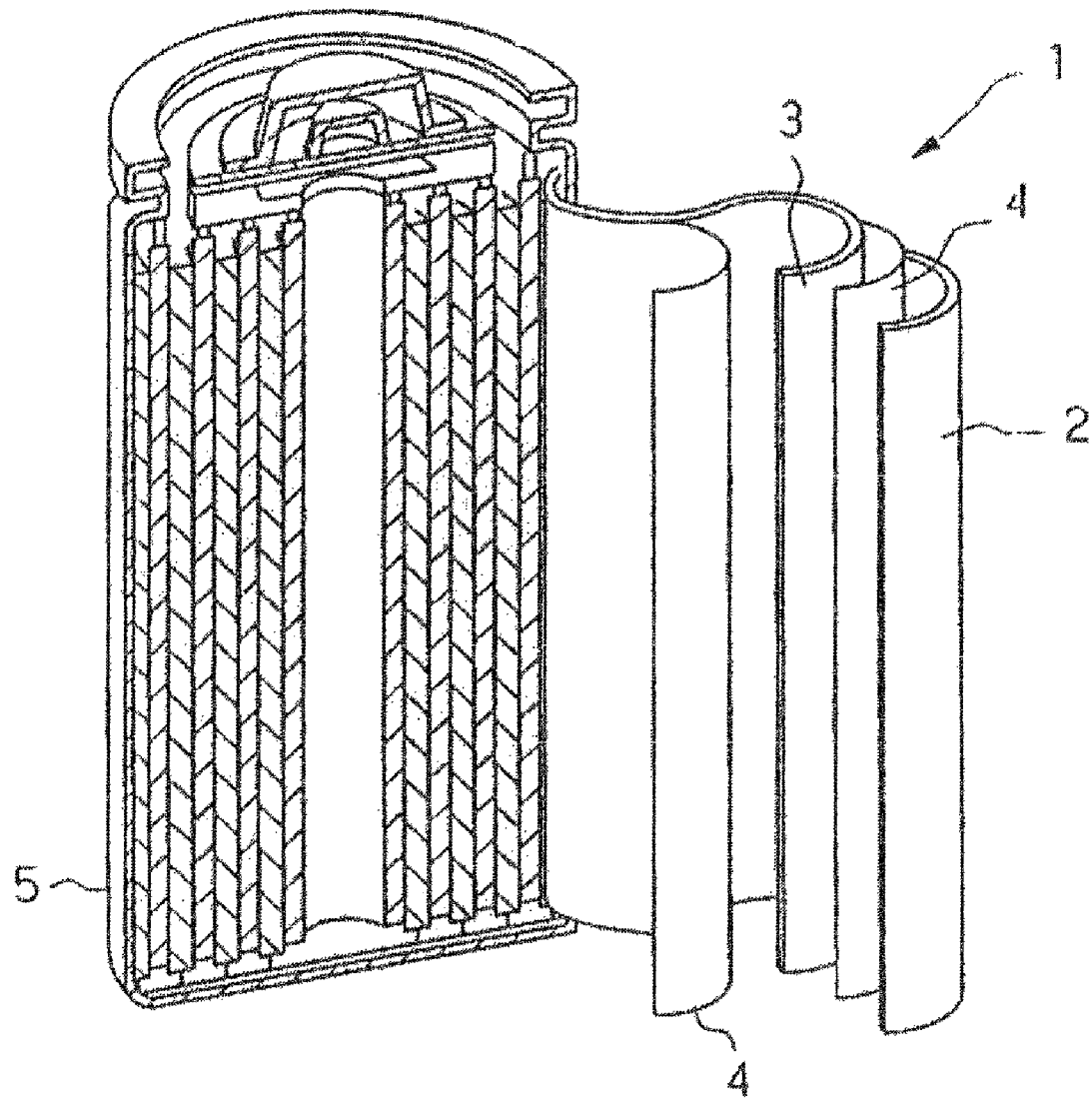
FIG. 1 shows a schematic view of a rechargeable lithium battery of the present invention.

A positive active material for a rechargeable lithium battery of the present invention is a lithium/nickel-based compound with secondary particles composed of primary particles whose average diameter is 1 µm to 4 µm. The average diameter of the secondary particles comprising the primary particles is preferably 5 µm to 20 µm, and more preferably 7 µm to 14 µm. When the average diameter of the secondary particles is under 5 µm, some side reactions can occur in a rechargeable lithium battery comprising the same. However, when the average diameter of the secondary particles is over 20 µm, the density of positive electrode mixture decreases and the secondary particles are easy to break, which results in the decomposition of the electrolyte and the generation of gas.

According to the present invention, carbon may be present on the surface of the positive active material, where the amount of the carbon is preferably less than 0.1 wt % of the total weight of the positive active material, more preferably between 0.05 to 0.07 wt %, and even more preferably between 0.05 to 0.06 wt %.

The carbon present on the surface of the positive active material is an impurity introduced in the preparation process. Lithium carbonate is formed on the surface through a reaction between $CO_2$ and unreacted lithium in the positive active material during a calcinating process. When the amount of the carbon increases, the swelling by the lithium carbonate also increases. When the amount of the carbon is over 0.1 wt % of the total weight of the positive active material, the inhibition on the swelling is not improved at high temperatures.

When the average diameter of the primary particles of the positive active material in the present invention is under 1 µm, the amount of the carbon increases during the fabrication of the positive electrode, which results in a reduction of the swelling inhibition. However, the use of the primary particles whose average diameter is over 4 µm can cause problems such as decreased capacity.

The X-ray diffraction intensity ratio I(003)/I(104) of the lithium/nickel-based compound has an X-ray diffraction pattern using CuKα of 1.04 to 1.15, and its full width at half maximum ranges from 0.14 to 0.16. When the full width at half maximum is under 0.14, the crystallinity of the positive active material is high and it can prevent the intercalating of Li ions in the positive electrode. When the full width at half maximum is over 0.16, the crystallinity of the positive active material is low and it can prevent the positioning of Li ions in the positive electrode. Therefore, the use of the positive active material with a full width at half maximum that is out of the range of 0.14 to 0.16 can cause problems such as decreased capacity.

The lithium/nickel-based compound is represented as one of the following chemical formulas (1) to (4):

$$Li_xNi_{1-y}Co_yO_{2-z}A_z \quad (1)$$

$$Li_xNi_{1-y-z}Co_yM_zA_2 \quad (2)$$

$$Li_xNi_{1-y-z}Co_yMn_zO_{2-\alpha}A_\alpha \quad (3)$$

$$Li_xNi_{1-y-z}Co_yMn_zM_wO_{2-\alpha hd}A_\alpha \quad (4)$$

where x, y, z, w, and α are given by $0.94 \leq x \leq 1.1$, $0 \leq y \leq 0.5$, $0 \leq z \leq 0.5$, $0 \leq w \leq 0.5$, $0 \leq \alpha 2$, M is at least one element selected from the group consisting of Al, Cr, Fe, Mg, Sr, V, and rare earth elements, and A is at least one element selected from the group consisting of O, F, S, and P.

A positive active material of the present invention is prepared by making an oxide material through the heat treatment of a hydroxide compound that includes nickel and cobalt, or nickel, cobalt, and a metal such as Al, Cr, Fe, Mg, Sr, V, and rare earth element, or nickel, cobalt, and manganese, or nickel, cobalt, manganese, and a metal such as Al, Cr, Fe, Mg, Sr, V, and rare earth elements. Next, the oxide material is mixed with a lithium-containing compound and a first heat treatment is performed on the resulting mixture, and then a second heat treatment is performed on the first heat-treated mixture.

A lithium/nickel-based positive active material has conventionally been prepared by mixing a hydroxide compound with a lithium-containing compound and heat-treating the mixture rather than heat-treating the hydroxide compound alone. This method results in primary particles with an average diameter that does not grow to 1 µm, and a significant amount of carbon remains on the surface, which causes swelling at high temperatures.

The present invention improves upon the conventional method as it increases the average diameter of the primary particles up to 1 µm and decreases the amount of the carbon on the surface to under 0.1 wt % of the total weight. It achieves this by heating the hydroxide compound to form the oxide compound, and then reacting it with a lithium compound and subjecting the resulting mixture to two heat treatments.

The oxide compound is formed by heating the hydroxide compound preferably for 5 to 10 hours at 500 to 1200° C., and more preferably for 5 to 10 hours at 700 to 1000° C. At heating temperatures under 500° C. or a treatment time less than 5 hours, the primary particles do not grow well. In contrast, at heating temperatures over 1200° C. or a treatment time more than 10 hours, the primary particles may grow well but the capacity of the resulting positive active material decreases at the final heat treatment.

The next step is to mix the resulting oxide compound with a lithium-containing compound and then proceed through the first heat treatment. The first heat treatment is preferably performed for 5 to 20 hours at 500 to 1000° C., and more preferably for 10 to 15 hours 700 to 800° C. When the temperature is under 500° C. or the amount of time is under 5 hours, the amount of carbon increases. In contrast, when the temperature is over 1000° C. or the amount of time is over 20 hours, the particles get too big and their functionality is deteriorated because it is hard to crush the particles.

The positive active material then proceeds through the second heat treatment, where heating is preferably performed for 10 to 40 hours at 700 to 1000° C., or more preferably for 20 to 40 hours at 800 to 900° C. If the treatment temperature is under 700° C. or the time is under 10 hours, the amount of the carbon present on the surface increases, while if the temperature is over 1000° C. or the time is over 40 hours, workability is deteriorated because the material is hard to crush.

The hydroxide compound that is converted into the oxide compound is prepared by co-precipitating salts of nickel, cobalt, and optionally manganese and a metal such as Al, Cr, Fe, Mg, Sr, V, and rare-earth elements. This preparation process is well-known and is well-described in Korean Patent Application No. 2002-26200 in which a hydroxide compound is prepared by mixing aqueous solutions containing source materials and controlling the pH. Oxides, hydroxides, nitrates, and sulfates including nickel, cobalt, optionally manganese and a metal can be used as the source materials. Lithium-containing compounds that react with the resulting oxide compound, include, but are not limited to, lithium hydroxide, lithium acetate, and lithium nitrate.

FIG. 1 shows a rechargeable lithium battery comprising the positive active material that embodies the present invention. The present invention provides a rechargeable lithium battery 1 comprising a negative electrode 2, a positive electrode 3, a separator 4 arrayed between the negative electrode 2 and the positive electrode 3, an electrolyte to immerse the negative electrode 2, positive electrode 3, and separator 4, and a cylindrical battery container. The rechargeable lithium battery 1 is constructed by laminating the negative electrode 2, positive electrode 3, and separator 4, winding them in a spiral, and finally placing those components into a battery container. However, the shape of a rechargeable lithium battery in the present invention is not limited to the particular one shown in FIG. 1, and can be prismatic or pouch shaped.

The negative active material includes lithium metal or a lithium-containing alloy, a material that is capable of reversibly intercalating and deintercalating lithium ions, or a material that can form a lithium-containing compound by reversibly reacting with lithium. An exemplary material that is capable of reversibly intercalating and deintercalating lithium ions is a carbonaceous material such as crystalline carbon or amorphous carbon, or a carbon composite. In addition, representative exemplary materials to form a lithium-containing compound that can reversibly react with lithium are tin oxide ($SnO_2$), titanium nitrate, silicon (Si), and so on, but it is not limited thereto. The lithium-containing alloy is an alloy formed by combining lithium and a metal including, but not limited to, Na, K, Rb, Cs, Fr, Be, Mg, Ca, Sr, Ba, Ra, Al, and Sn.

The electrolyte includes a lithium salt which is dissolved in a non-aqueous organic solvent. The lithium salt enables the rechargeable lithium battery to work by providing a source of lithium ions, and promoting the movement of lithium ions between the positive and negative electrodes. Representative examples of the lithium salt include, more than one or two from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_mF_{2m+1}SO_2)(C_nF_{2n+1}SO_2)$ (where m and n are integers), LiCl, and LiI. The preferred concentration of the lithium salt ranges from 0.6 to 2.0 M. When the concentration of the lithium salt is under 0.6 M, the conductivity of the electrolyte decreases and the performance of the electrolyte generally worsens. However, when the concentration of lithium salt is over 2.0 M, the viscosity of the electrolyte increases, which results in decreasing the movement of lithium ions.

The non-aqueous organic solvent acts as a medium through which ions can flow during the electrochemical reaction of a battery. The non-aqueous organic solvent may include more than one compound such as a carbonate, ester, ether, or a ketone. As for the carbonate, a cyclic carbonate or linear carbonate can be used. When more than one solvent is used, the mixing ratio can be regulated according to the intended capacity of a battery by a person of ordinary skill in the art. Possible cyclic carbonates are ring carbonates which may include but are not limited to, ethylene carbonate, propylene carbonate, and a mixture thereof. Possible linear carbonates may include but are not limited to, dimethyl carbonate, diethyl carbonate, ethylmethyl carbonate, and methylpropyl carbonate. Possible esters may include but are not limited to, v-butyrolactone, valerolactone, decanolide, and mevaloratone and the ketone may be, polymethylvinyl ketone, for example.

The following examples illustrate the present invention in further detail. However, it is understood that the present invention is not limited by these examples.

COMPARATIVE EXAMPLE 1

A positive active material of $Li_{1.02}Ni_{0.8}Co_{0.1}Mn_{0.1}O_2$ with an average primary particle diameter of 0.3 μm was prepared by mixing $Ni_{0.8}Co_{0.1}Mn_{0.1}(OH)_2$ and LiOH in a mole ratio of Li:(Ni+Co+Mn) is 1.02:1, treating the mixture with heat for 10 hours at 700° C., crushing it, and then performing a second heat treatment thereto for 20 hours at 780° C.

COMPARATIVE EXAMPLE 2

$Ni_{0.8}Co_{0.1}Mn_{0.1}O_2$ was prepared by sintering $Ni_{0.8}Co_{0.1}Mn_{0.1}(OH)_2$ for 10 hours at 700° C. Next, a mixture of the $Ni_{0.8}Co_{0.1}Mn_{0.1}O_2$ and LiOH in a mole ratio of Li:(Ni+Co+Mn) of 1.02:1 was treated with heat for 10 hours at 800° C. It was then crushed before performing a second heat treatment for 50 hours at 1050° C. The resulting compound is the positive active material of $Li_{1.02}Ni_{0.8}Co_{0.1}Mn_{0.1}O_2$ with an average primary particle diameter of 5 μm.

EXAMPLE 1

$Ni_{0.8}Co_{0.1}Mn_{0.1}O_2$ was prepared by sintering $Ni_{0.8}Co_{0.1}Mn_{0.1}(OH)_2$ for 10 hours at 700° C. Next, a mixture of the $Ni_{0.8}Co_{0.1}Mn_{0.1}O_2$ and LiOH in a mole ratio of Li:(Ni+Co+Mn) of 0.94:1 was treated with heat for 10 hours at 700° C. It was then crushed before performing a second heat treatment for 15 hours at 81° C. The resulting compound is the positive active material of $Li_{0.94}Ni_{0.8}Co_{0.1}Mn_{0.1}O_2$ with an average primary particle diameter of 1 μm.

EXAMPLE 2

$Ni_{0.8}Co_{0.1}Mn_{0.1}O_2$ was prepared by firing $Ni_{0.8}Co_{0.1}Mn_{0.1}(OH)_2$ for 10 hours at 700° C. Next, mixtures of the $Ni_{0.8}Co_{0.1}Mn_{0.1}O_2$ and LiOH in mole ratios of Li:(Ni+Co+Mn) of 0.94:1, and 0.96:1 were treated with heat for 10 hours at 700° C., respectively. They were then crushed before performing a second heat treatment for 20 hours at 810° C. The resulting compounds are the positive active materials of $Li_{0.94}Ni_{0.8}Co_{0.1}Mn_{0.1}O_2$, and $Li_{0.96}Ni_{0.8}Co_{0.1}Mn_{0.1}O_2$ with an average primary particle diameter of 2 μm.

EXAMPLE 3

$Ni_{0.8}Co_{0.1}Mn_{0.1}O_2$ was prepared by sintering $Ni_{0.8}Co_{0.1}Mn_{0.1}(OH)_2$ for 10 hours at 700° C. Next, mixtures of the $Ni_{0.8}Co_{0.1}Mn_{0.1}O_2$ and LiOH in mole ratios of Li:(Ni+Co+Mn) of 0.94:1, 0.96:1, and 0.98:1 were treated with heat for 10 hours at 800° C., respectively. They were then crushed before performing a second heat treatment for 20 hours at 81° C. The resulting compounds are the positive active materials of $Li_{0.94}Ni_{0.8}Co_{0.1}Mn_{0.1}O_2$, $Li_{0.96}Ni_{0.8}Co_{0.1}Mn_{0.1}O_2$, and $Li_{0.98}Ni_{0.8}Co_{0.1}Mn_{0.1}O_2$ with an average primary particle diameter of 3 μm.

EXAMPLE 4

$Ni_{0.8}Co_{0.1}Mn_{0.1}O_2$ was prepared by firing $Ni_{0.8}Co_{0.1}Mn_{0.1}(OH)_2$ for 10 hours at 700° C. Next, mixtures of the $Ni_{0.8}Co_{0.1}Mn_{0.1}O_2$ and LiOH in mole ratios of Li:(Ni+Co+Mn) of 0.94:1, 0.96:1, 0.98:1, and 1.00:1 were treated with heat for 10 hours at 800° C., respectively. They were then crushed before performing a second heat treatment for 20 hours at 830° C. The resulting compounds are the positive active materials of $Li_{0.94}Ni_{0.8}Co_{0.1}Mn_{0.1}O_2$, $Li_{0.96}Ni_{0.8}Co_{0.1}Mn_{0.1}O_2$, $Li_{0.98}Ni_{0.8}Co_{0.1}Mn_{0.1}O_2$, and $LiNi_{0.8}Co_{0.1}Mn_{0.1}O_2$ with an average primary particle diameter of 3 μm.

EXAMPLE 5

$Ni_{0.8}CO_{0.1}Mn_{0.1}O_2$ was prepared by firing $Ni_{0.8}Co_{0.1}Mn_{0.1}(OH)_2$ for 10 hours at 700° C. Next, mixtures of the $Ni_{0.8}CO_{0.1}Mn_{0.1}O_2$ and LiOH in mole ratios of Li:(Ni+Co+Mn) of 0.94:1, 0.96:1, 0.98:1, and 1.00:1 were treated with heat for 10 hours at 800° C., respectively. They were then crushed before performing a second heat treatment for 40 hours at 830° C. The resulting compounds are the positive active materials of $Li_{0.94}Ni_{0.8}Co_{0.1}Mn_{0.1}O_2$, $Li_{0.96}Ni_{0.8}Co_{0.1}Mn_{0.1}O_2$, $Li_{0.98}Ni_{0.8}Co_{0.1}Mn_{0.1}O_2$, and $LiNi_{0.8}Co_{0.1}Mn_{0.1}O_2$ with an average primary particle diameter of 4 μm.

Figure 2:
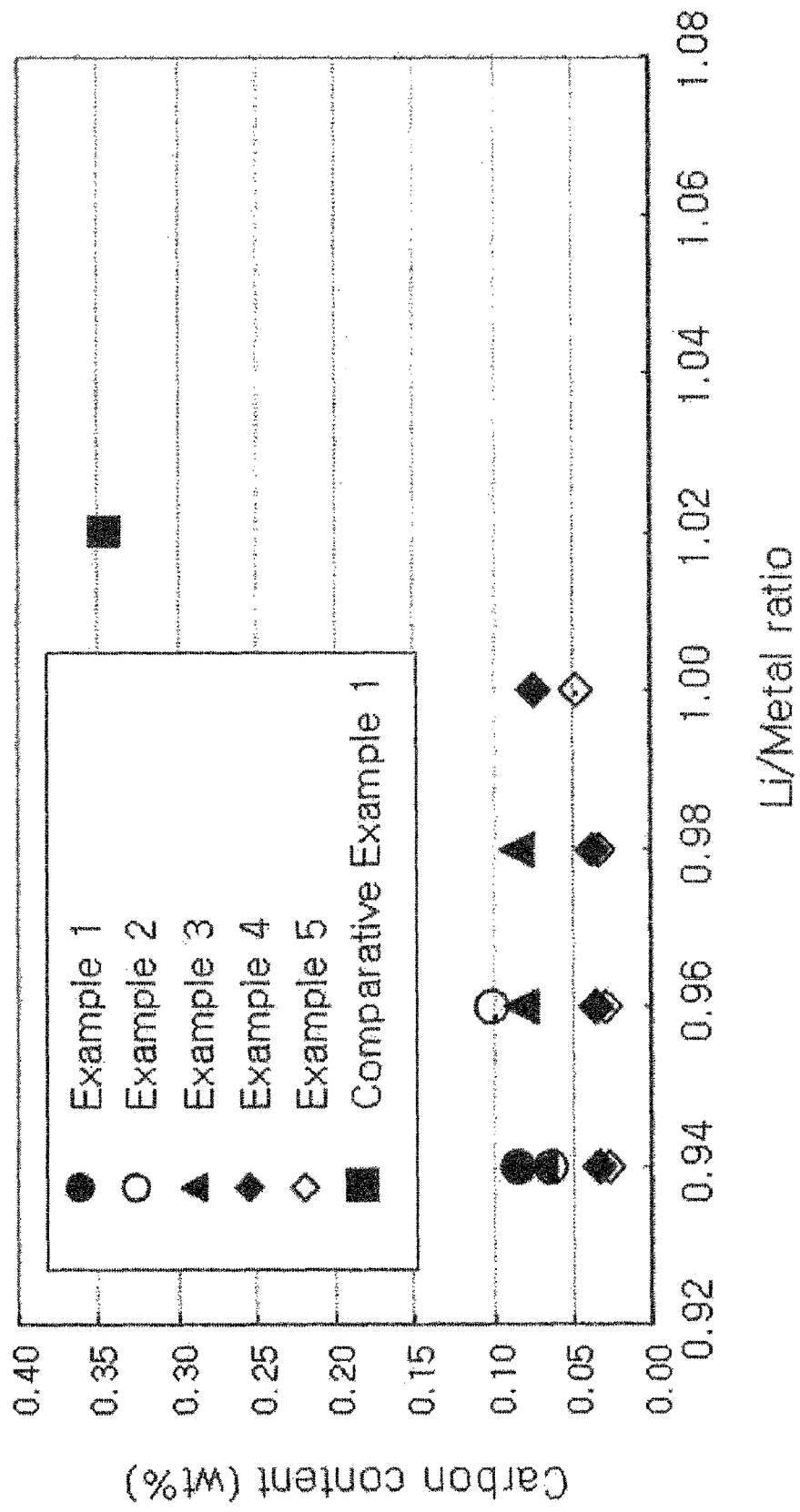
FIG. 2 is a graph showing the amount of carbon content according to the molar ratio of Li:(Ni+Co+Mn) in positive active materials according to Examples 1 to 5 of the present invention.
Figure 3A:
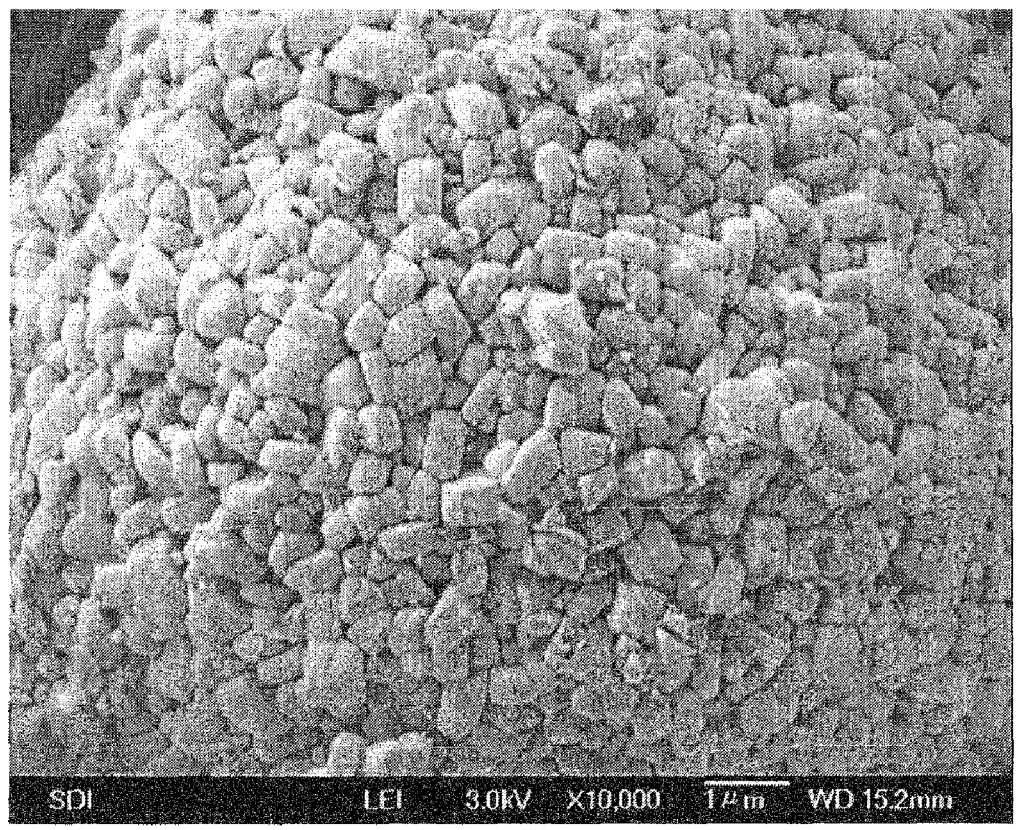
FIGS. 3A to 3E are scanning electron microscope (SEM) photographs of positive active materials according to Comparative Example 1 and Examples 1 to 4.
Figure 3B:
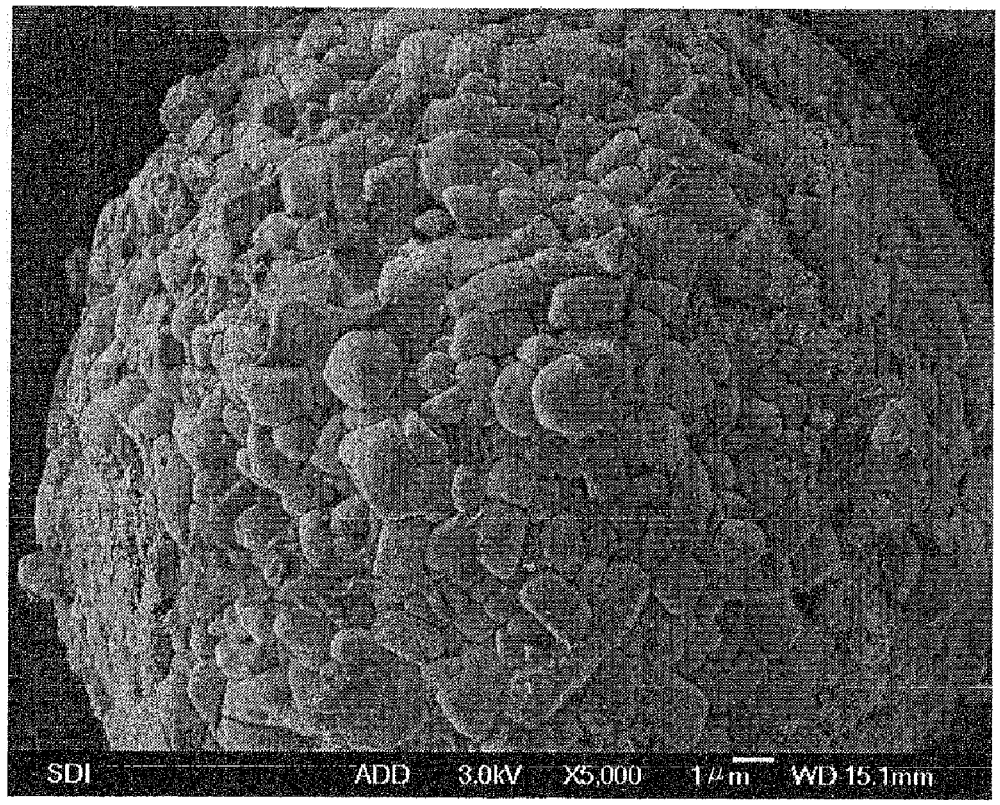
Figure 3C:
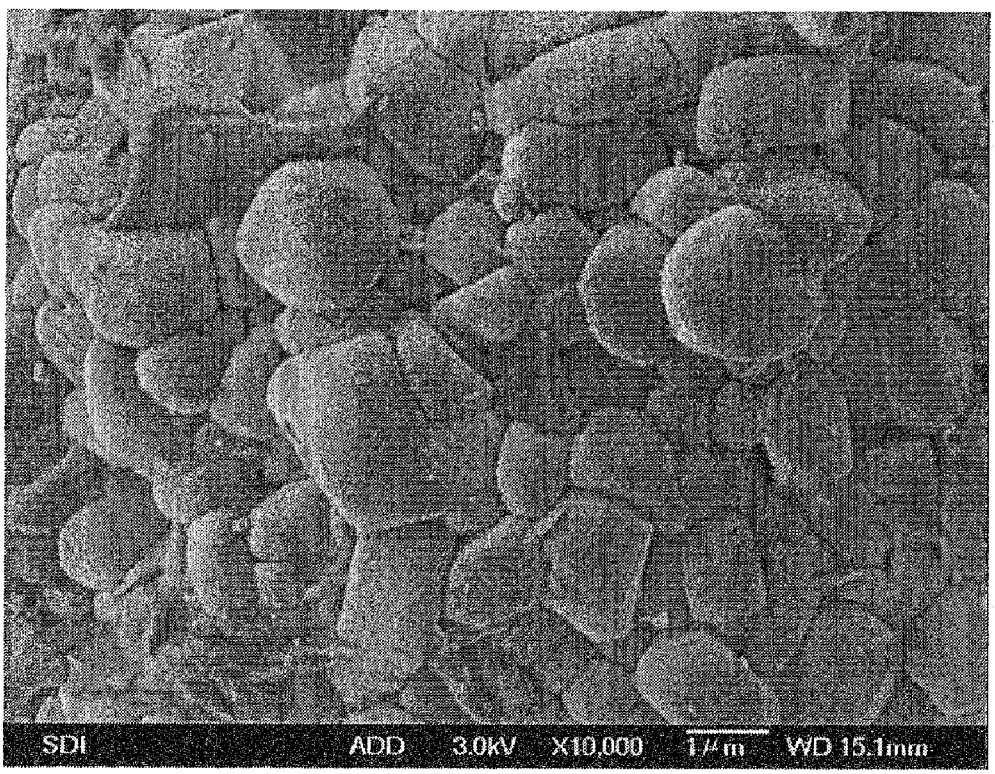
Figure 3D:
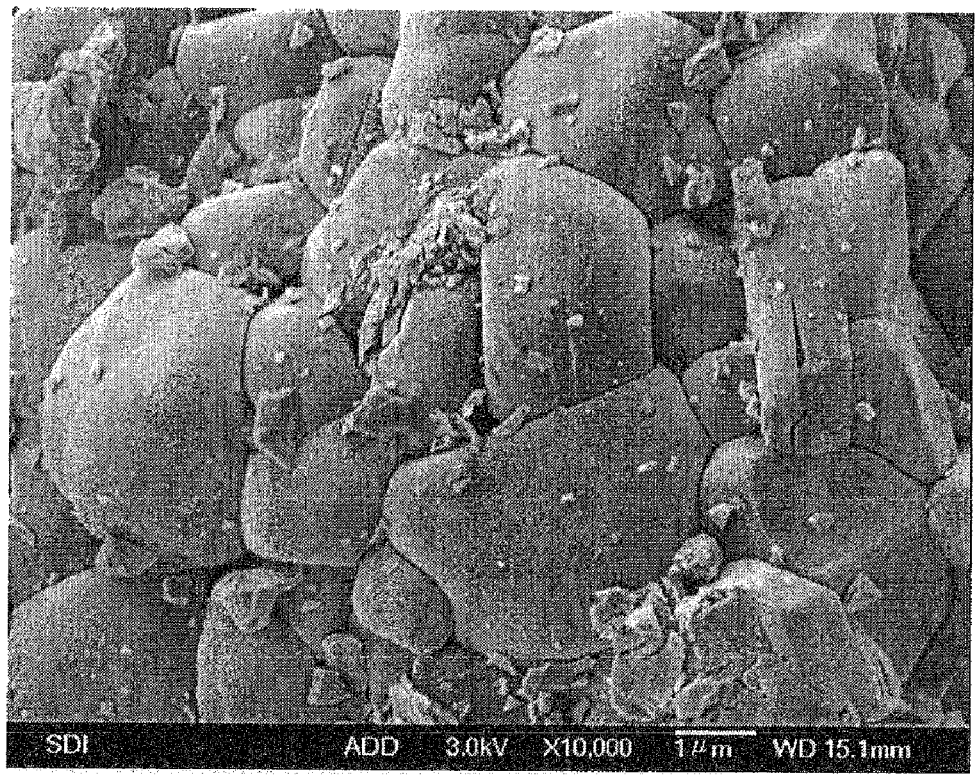
Figure 3E:
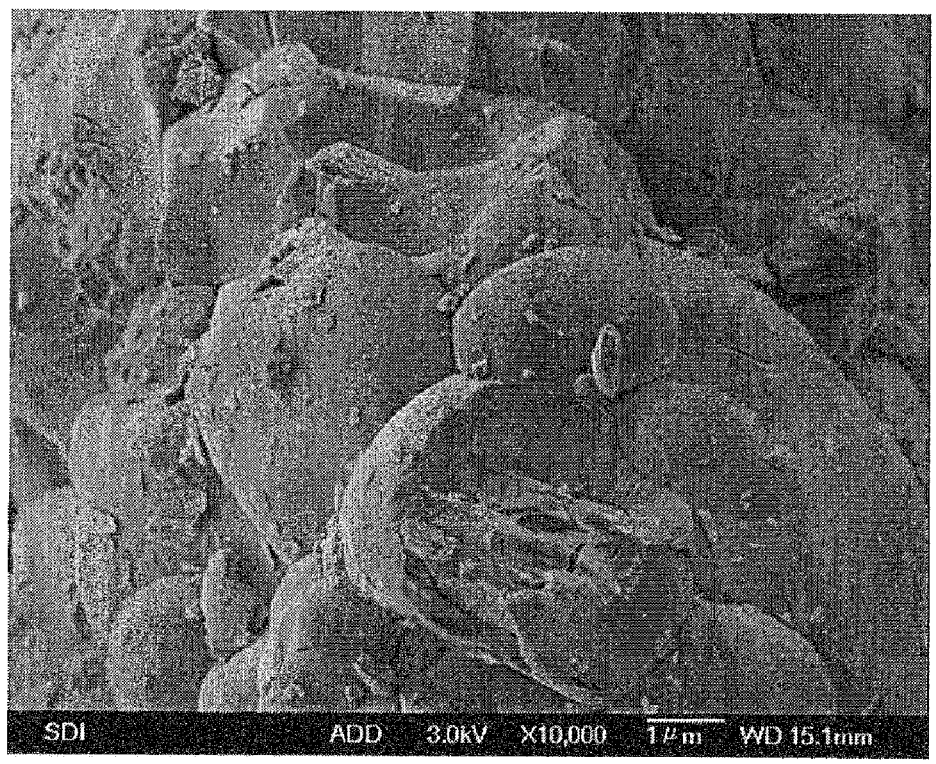

FIG. 2 shows the amount of carbon present on the surface of the positive active materials according to Comparative Example 1 and Examples 1 to 5, measured with a CS determinator (CS-444). The amount of carbon on the surface of the positive active material of Examples 1 to 5, which embody the present invention, is sharply lower compared to Comparative Example 1.

FIGS. 3A to 3E show photographs of the primary particles of positive active materials taken with a scanning electron microscope (SEM) according to Comparative Example 1 and Examples 1 to 4, respectively. The average diameter of the primary particles in Examples 1 to 4 were bigger than those in the Comparative Example 1, as shown in FIGS. 3A to 3E.

In order to coat the positive active material onto the positive electrode, a slurry was first formed. Slurries were made by combining the positive active materials prepared according to Comparative Examples 1 and 2 and Examples 1 to 5, a conductive agent (super P), and a binder (PVDF) in a weight ratio of 94:3:3 with N-methylpyrrolidone (NMP). A positive electrode was fabricated by coating the slurry on an aluminum foil, drying it, and compressing it with a roll press.

Similarly, a negative electrode was fabricated by coating a slurry consisting of artificial graphite (PHS) for a negative active material, oxalic acid, and a binder (PVDF) in the weight ratio of 89.8:0.2:10 and NMP onto an aluminum foil. The foil was then dried and compressed with a roll press. Next, a separator made of a polyethylene (PE) porous film was inserted between the aforementioned positive and negative electrodes and placed in a battery container. Finally, an electrolyte solution prepared by dissolving 1 mol/L $LiPF_6$ in a mixed solvent of propylene carbonate (PC), diethyl carbonate (DEC), and ethylene carbonate (EC) (PC:DEC:EC=1:1:1) was injected into the battery container resulting in a prismatic rechargeable lithium battery.

The degree of swelling of the lithium battery fabricated according to the aforementioned method was examined by checking the thickness before and after being charged to 4.2V at 0.5 C (Coulomb) and being left for 4 hours in a chamber with a high temperature of over 85° C. The rechargeable lithium batteries comprising the positive active materials with the a carbon fraction of less than 0.01 wt % of the total weight as in Examples 1 to 5 turned out to have excellent inhibition to swelling at a high temperature, showing only a small increase in thickness.

Figure 4:
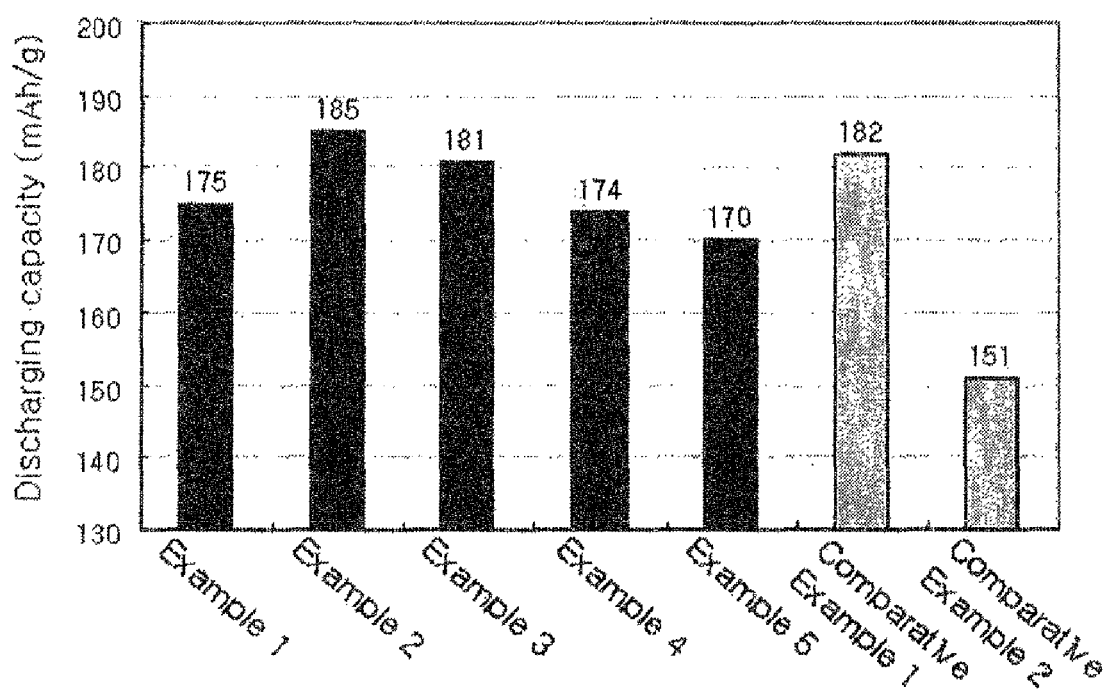
FIG. 4 is a graph showing discharge capacity of rechargeable batteries according to Examples 1 to 5 and Comparative Example 1 and 2.

The discharge capacities of the rechargeable lithium batteries according to Examples 1 to 5 were measured, and the results are shown in FIG. 4. As shown in FIG. 4, the rechargeable lithium batteries had relatively high discharge capacities. On the contrary, the rechargeable lithium battery including the positive active material of Comparative Example 2 wherein the primary particles had an average diameter of 5 μm had a low discharge capacity.

A positive active material of the present invention has excellent inhibition to swelling at a high temperature as well as outstanding electrochemical performance. The invention achieves this by reducing the amount of carbon on the surface and regulating the average diameter of the primary particles of the lithium-nickel-based positive active material.

The foregoing is considered illustrative only of the principles of the invention. Further, since numerous modifications and changes will readily become apparent to those skilled in the art, it is not desired to limit the invention to the exact construction and operation shown and described. Accordingly, all suitable modifications and equivalents fall within the scope of the invention and the appended claims.

What is claimed is:

1. A method of preparing a positive active material, comprising:
    heating a hydroxide compound that includes nickel and cobalt, or nickel, cobalt, and at least one metal selected from the group consisting of Al, Cr, Fe, Mg, Sr, V, and rare earth elements, or nickel, cobalt, and manganese, or nickel, cobalt, manganese, and at least one metal selected from the group consisting of Al, Cr, Fe, Mg, Sr, V, and rare earth elements to obtain an oxide material;
    mixing the oxide material with a lithium-containing compound;
    performing a first heat treatment to the resulting mixture; and
    performing a second heat treatment to the first heat-treated mixture to obtain a lithium/nickel-based compound,
    wherein primary particles of the positive active material have an average particle diameter ranging from 1 μm to 4 μm are agglomerated to form secondary particles of the lithium/nickel-based compound and,
    wherein the heat treatment of the hydroxide compound is performed at 700 to 1000° C.

2. The method of claim 1,
    wherein the average diameter of the secondary particles is between 5 μm to 20 μm.

3. The method of claim 1, wherein the first heat treatment is performed at 500 to 1000° C.

4. The method of claim 1,
    wherein the second heat treatment is performed at 700 to 1000° C.

5. The method of claim 1,
    wherein the amount of carbon on the surface of the positive active material prior to fabrication of a positive electrode is less than 0.1 wt % of the total weight of the positive active material.

6. The method of claim 5,
    wherein the amount of the carbon is between 0.05 wt % to 0.07 wt % of the total weight of the positive active material.

7. The method of claim 6,
    wherein the amount of the carbon is between 0.05 wt % to 0.06 wt % of the total weight of the positive active material.

8. The method of claim 1,
    wherein the lithium/nickel-based compound has an X-ray diffraction intensity ratio I(003)/I(104) in an X-ray diffraction pattern using CuKα ranging from 1.04 to 1.15, and a full width at half maximum ranging from 0.14 to 0.16.

9. The method of claim 1,
wherein the positive active material is represented by at least one of the following formulas (1) to (4):

$$Li_xNi_{1-y}Co_yO_{2-z}A_z \quad (1)$$

$$Li_xNi_{1-y-z}Co_yM_zA_2 \quad (2)$$

$$Li_xNi_{1-y-z}Co_yMn_zO_{2-\alpha}A_\alpha \quad (3)$$

$$Li_xNi_{1-y-z}Co_yMn_zO_{2-\alpha}A_\alpha \quad (4)$$

wherein x, y, z, w, and a are given by $0.94 \leq x \leq 1.1$, $0 \leq y \leq 0.5$, $0 \leq z \leq 0.5$, $0 \leq w \leq 0.5$, $0 \leq \alpha \leq 2$, wherein M is at least one element selected from the group consisting of Al, Cr, Fe, Mg, Sr, V, and rare earth elements, wherein A is at least one element selected from the group consisting of O, F, S, and P.

* * * * *